US006870971B2

(12) United States Patent
Lin et al.

(10) Patent No.: US 6,870,971 B2
(45) Date of Patent: Mar. 22, 2005

(54) TWO-STAGE OPTICAL ISOLATOR WITH SIMPLIFIED ASSEMBLY PROCESS AND IMPROVED PERFORMANCE

(75) Inventors: Bin Lin, Fuzhou (CN); Jinxiu Lin, Fuzhou (CN)

(73) Assignee: Photop Koncent, Inc., Fuzhou (CN)

( * ) Notice: Subject to any disclaimer, the term of this patent is extended or adjusted under 35 U.S.C. 154(b) by 345 days.

(21) Appl. No.: 10/041,399

(22) Filed: Jan. 8, 2002

(65) Prior Publication Data

US 2003/0048972 A1 Mar. 13, 2003

(51) Int. Cl.[7] ............................................. G02B 6/00
(52) U.S. Cl. .......................... 385/11; 385/27; 385/31; 385/39
(58) Field of Search ............................ 385/11, 14, 15, 385/20, 31, 39, 27; 349/117

(56) References Cited

U.S. PATENT DOCUMENTS 5,606,439 A * 2/1997 Wu ............................ 349/117

* cited by examiner

Primary Examiner—Brian Healy
Assistant Examiner—Michael P. Mooney
(74) Attorney, Agent, or Firm—Bo-In Lin

(57) ABSTRACT

The present invention discloses an optical isolator for preventing a reverse light transmission in a forward light transmission device. The optical isolator includes at least two birefringent crystals for forward projecting an incident light. The first birefringent crystal first separates the incident light into divergent beam components and the second birefringent crystal converges the divergent beam components into converging beam components for recombining into an output light. The second birefringent crystal receiving a light transmitting in a direction opposite the forward projecting incident light for producing separate and diverging beam components to project into the first birefringent crystal for further diverging the beam components by the first birefringent crystal.

16 Claims, 3 Drawing Sheets

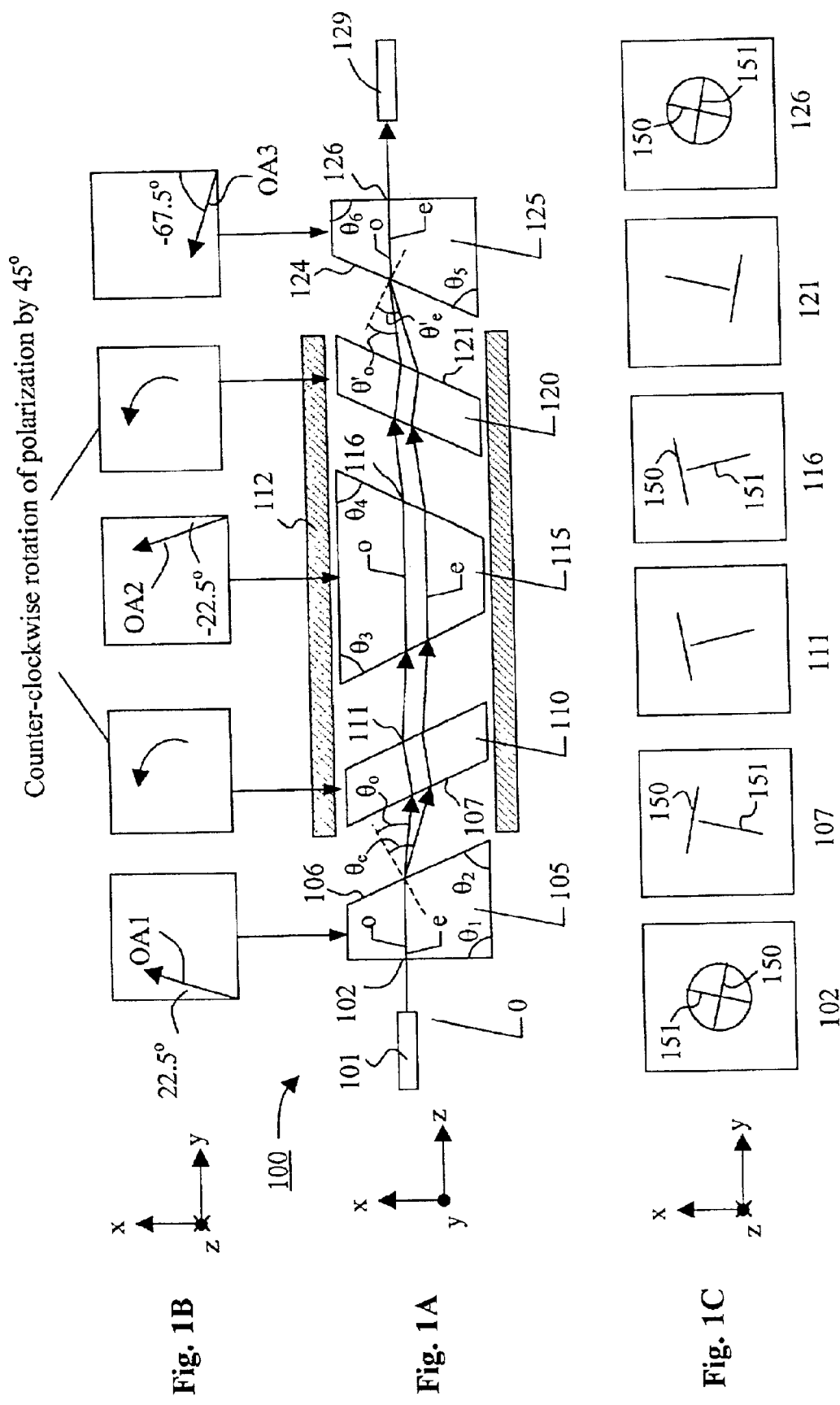

TWO-STAGE OPTICAL ISOLATOR WITH SIMPLIFIED ASSEMBLY PROCESS AND IMPROVED PERFORMANCE

FIELD OF THE INVENTION

This invention generally relates to devices implemented in optical communication systems. More specifically, this invention relates to optical isolator with improved performance of broad bandwidth and lower insertion while can be produced at lower cost with reduced size.

BACKGROUND OF THE INVENTION

Conventional two-stage isolators generally comprise two single-stage isolators in series to increase isolation and bandwidth. Each single-stage isolator further comprises one non-reciprocal polarization rotator and two birefringent optical wedges. Thus a total of four birefringent optical wedges are needed. As a result, the conventional isolators are more difficult to assemble due to the fact that there are more interfacing surfaces between these four wedges, and that the relative orientations of the optical axes among these wedges have to be precisely aligned to guarantee good isolation within certain bandwidth. In addition to the requirement of achieving good optical isolation, the alignment processes must also simultaneously control two other functional parameters, i.e., adjustments and control of the polarization mode dispersion (PMD) and polarization dependent loss (PDL). The reliability is often degraded due to the difficulties in the assembling processes. All these difficulties limit the usefulness and functionality of the conventional isolators.

Therefore, a need still exists in the art of manufacturing and designing the fiber-optic communication system to provide an improved isolator design and configuration to overcome the difficulties encountered in the prior art. It is desirable that the new isolator configurations and method of manufacturing can provide isolators of reduced number of required optical wedges and therefore reduced number of interfacing surfaces between these wedges. It is also desirable that the process of compensating for PMD can be decoupled from the process of controlling isolation and PDL. Thus the above-mentioned difficulties associated with assembly and alignment of optical wedges and limitations of insertion loss and polarization dependent losses can be resolved.

SUMMARY OF THE PRESENT INVENTION

It is therefore an object of the present invention to provide new isolator configuration and methods of manufacture for producing isolator with less number of required optical wedges. The isolator can be produced at lower cost with simpler assembling process and achieving better performance with reduced polarization dependent losses thus resolving the difficulties and limitations discussed above.

Specifically, it is an object of the present invention to provide a new isolator configuration by using three birefringent optical wedges thus reduces the number of components required to produce isolator using a simplified manufacturing process and providing higher reliable isolators. Furthermore, the isolator has less insertion loss and polarization dependent loss (PDL) because the optical transmission is projected through less number of interfacing surfaces in the isolator of this invention then that of the conventional isolators.

In a preferred embodiment, this invention discloses an apparatus and a method for preventing a reverse light transmission in a forward light transmission. The apparatus may include three birefringent elements, two non-reciprocal polarization rotators, and a permanent magnet ring that provides magnetic field. The method includes steps of A) employing at least two birefringent means for forward projecting an incident light for first separating the incident light into divergent beam components having orthogonal polarizations by a first birefringent means. Then, converge the divergent beam components into converging beam components by a second birefringent means for recombining into an output light. And, B) arranging the birefringent means for receiving a light transmitting in a direction opposite the forward projecting incident light for producing separate and diverging beam components having orthogonal polarizations by the second birefringent means to project into the first birefringent means to further diverge the beam components by the first birefringent means.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 1A to 1C are respectively a cross sectional view, light-path and polarization diagram and functional diagram for showing the polarization angle changes during different stages of forward transmission of an isolator of this invention;

DETAILED DESCRIPTION OF THE INVENTION

Figures 2A, 2B, 2C:
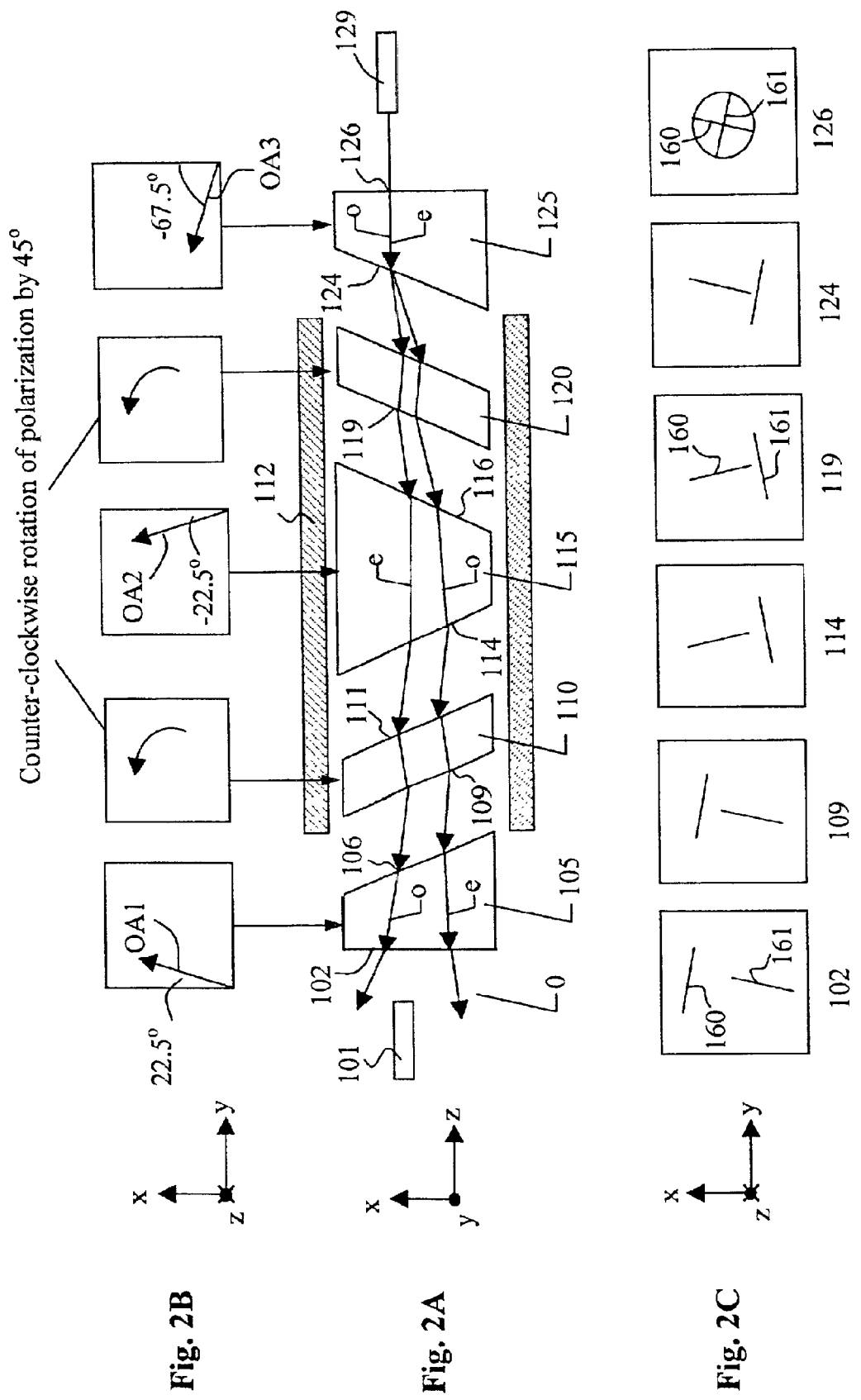
FIGS. 2A to 2C are respectively a cross sectional view, light-path and polarization diagram and functional diagram for showing the polarization angle changes during different stages of reverse transmission of an isolator of this invention.

Referring to FIG. 1A for a side cross sectional view for showing the optical components of an isolator 100 of this invention. The isolator generally comprises first, second, and third birefringent elements 105, 115, and 125, first and second non-reciprocal polarization rotators 110, 120, and a permanent magnet ring 112. Associated with each of the optical components, FIG. 1B is a functional block diagram for showing the optical axis for each of the birefringent components and the direction of polarization rotation for each of the non-reciprocal polarization rotators. FIG. 1C is a polarization diagram for illustrating the position of the optical beams and state of polarization (SOP) on each of the interfacing surfaces immediately after the optical beams are transmitted through each of these optical components.

The birefringent elements 105, 115, 125 may be made of any birefringent material such as rutile, calcite, yttrium orthovanadate ($YVO_4$) and the like. A birefringent crystal is characterized by an optical axis shown as OA1, OA2, and OA3 respectively for the birefringent elements 105, 115 and 125. Light traveling with polarization perpendicular to the plan containing optical axis and the propagation vector is referred as ordinary component, or o-component. Light traveling with polarization parallel to the plan containing optical axis and the propagation vector is referred as extraordinary component, or e-component. The refractive index of o-component $n_o$ in the birefringent element is general different from the refractive index of e-component $n_e$. For positive birefringent crystals such as YVO$_4$, $n_e > n_o$. For negative birefringent crystals such as calcite, $n_e < n_o$. In the embodiment shown in FIGS. 1A–1C, birefringent crystals 105, 115, and 125 are positive birefringent crystals. The optical axis OA2 in the second birefringent crystal 115 is oriented at 45° with respect to the optical axis OA1 in the first birefringent crystal 105. The optical axis OA3 in the third birefringent crystal 125 is oriented at 90° with respect to the optical axis OA1 in the first birefringent crystal 105. The wedge angles $\theta_1$ to $\theta_5$ are chosen such that $\theta_1 = \theta_6$, $\theta_2 = \theta_3$, and $\theta_4 = \theta_5$.

Referring to FIG. 1A, a light is projected through an input collimator 101 onto a birefringent crystal 105 of the isolator 100. The birefringent crystal 105 has an optical axis OA1 with an inclined angle of 22.5° relative to the vertically oriented x-axis, as shown in FIG. 1B. After entering the first birefringent crystal 105, the light beam is divided into an ordinary component 150 perpendicular to OA1 and an extraordinary component 151 parallel to OA1 as shown in cross-section 102 of FIG. 1C. Due to difference in refractive index for o-component and e-component, the two components 150, 151 diffract at different angles at the inclined surface 106 of the first birefringent element 105. According to the Snell's law, the refraction angle $\theta_e$ of the e-component is greater than the refraction angle $\theta_o$ of the o-component for positive birefringent crystals. Thus the two beams 150, 151 are spatially separated as they travel through a predetermined distance between the first birefringent crystal 105 and the first Faraday rotator 110, as shown in cross-section 107 of FIG. 1C. The two beams are then projected to a Faraday rotator 110 where the polarization of each of these beam components is rotated forty-five degrees (45°) along a counter-clockwise direction with the state of polarization at point 111 shown in cross-section 111 of FIG. 1B. These two beam components are then projected onto a second birefringent crystal 115 that has an optical axis OA2 oriented at an inclined angle of –22.5° relative the x-axis, as shown in FIG. 1B. The optical axis OA2 is therefore perpendicular to the polarization of component 150, and parallel to the polarization of component 151, of the incident beam from point 111. In other words, component 150 is o-beam and component 151 is e-beam inside the second birefringent crystal 115. After two beams 150 and beam 151 pass through the second Faraday rotator 120, their polarizations are further rotated by 45° along a counter-clockwise direction, as shown in cross-section 121 of FIG. 1C. The polarization angles of these two beam components as that shown on point 121 are turned to ninety degrees (90°) relative to the polarization angles of these beam components when projecting out from the first birefringent crystal 105. These two beam components are converged as they travel toward a third birefringent crystal 125. The third birefringent crystal has an optical axis OA3 with an inclined angle of –67.5° relative to the x-axis. The optical axis OA3 is therefore perpendicular to that of the optical axis OA1 of the first birefringent crystal 105. Inside the third birefringent crystal 125, beam 150 is o-component; beam 151 is e-component. According to the Snell's law, beam 151 refracts more than beam 150 at the inclined surface 124 of the third birefringent crystal. In other words, the angle, $\theta'_e$, between the norm of surface 124 and the propagation direction of beam 151 is greater than the angle, $\theta'_o$, between the norm of surface 124 and the propagation direction of beam 150. With proper choice of the wedge angles and the gaps in between birefringent crystals 105, 115, and 125, the two beams 150, 151 can be brought together with no offset between the two beams after they refract at the inclined surface 124. The coincidence of beam 150 and beam 151 is in general not achievable in the prior art where four birefringent crystals are employed. The two beams 150, 151 are then recombined into a non-polarized light at point 126 for projecting unto an output collimator 129. Thus, along a forward transmission direction, the light projected from the input collimator 101 is transmitted to an output collimator 129.

FIG. 2A depicts the optical paths when the light is projected from the output collimator 129 toward the input collimator 101. FIG. 2B depicts the incline angles of optical axes for three birefringent crystals 105, 115, and 125, and the direction of polarization rotation in Faraday rotators 110 and 120. FIG. 2C is a polarization diagram for illustrating the position of the optical beams and state of polarization (SOP) on each of the interfacing surfaces immediately after the optical beams are transmitted through each of these optical components. After entering the birefringent crystal 125 at point 126, the light beam is divided into an ordinary component 160 perpendicular to OA3 and an extraordinary component 161 parallel to OA3 by the birefringent crystal 125, as shown in cross-section 126 of FIG. 2C. These two components are projected to the second Faraday rotator 120 where each of these beam components is rotated forty-five degrees (45°) along a counter-clockwise direction with the state of polarization at point 119, as shown in cross-section 119 of FIG. 2C. These two beam components are then projected onto the second birefringent crystal 115 that has an optical axis OA2 aligned at –22.5° relative to the x-axis. The optical axis OA2 is therefore parallel to the component 160 and perpendicular to the component 161 of the incident beam projected from point 119. In other words, component 160 becomes e-beam, and similarly component 161 becomes o-beam inside the second birefringent crystal 115. As a result, after refraction at the surface 116 of the second birefringent crystal 115, beam 160 and beam 161 propagate away from each other in divergent directions. At the output of the first Faraday rotator 110, the polarization angle of beams 160, 161 are further rotated by forty-five degrees along a counterclockwise direction, as shown in cross-section 109 of FIG. 2C. The polarization angles of these two beam components as that shown on point 109 are turned to ninety degrees (90°) relative to the polarization angles of these beam components when projecting out from the third birefringent crystal 125. These two beam components are projected to the first birefringent crystal 105 that has an optical axis OA1 with an inclined angle of 22.5° relative to the x-axis. Inside the first birefringent crystal 105, the beam component 160 is transformed back to o-beam; similarly the beam component 161 is transformed back to e-beam. After refraction at the surfaces 106 and 102 of the first birefringent crystal 105, the components 160, 161 are traveling further apart with even greater divergent angles. The divergent effect is generated because of the non-reciprocal nature of the Faraday rotators 110, 120 that reverses the polarization directions of the return beams. Consequently the propagation directions of the beams are diverged upon refraction at the birefringent crystal surfaces. These divergent beams are prevented from returning to the input collimator 101. Thus, along a backward transmission direction, the light projected from the output collimator 129 is not transmitted to an input collimator 102 to function as an optical isolator.

According to above descriptions, this invention discloses an optical isolator for preventing a reverse light transmission in a forward light transmission device. The optical isolator includes a first birefringent means for receiving an incident light projecting in a forward-projection direction for separating the incident light into forward-projecting separate beam components. The isolator further includes a second birefringent means for receiving the forward-projecting separate beam components for converging the separate beam components into forward-projecting converging beam components for projecting into a third birefringent means for recombining into an output light. The third birefringent means further receiving a reverse incident light transmitted in a reverse direction opposite the forward projecting incident light for separating the reverse incident light into reverse-projecting separate beam components to project into the second birefringent means for producing further diverged reverse-projecting beam components. The further-diverged reverse beam components are projected into the first birefringent means to further diverge the reverse-projecting further-diverged beam components in the first birefringent means. In a preferred embodiment, the second birefringent means having a birefringent optical axis for converging the forward-projecting divergent beam components and for further diverging the reverse-projecting separate beam components. In another preferred embodiment, the second birefringent means further having a wedge shape with first and second incline surfaces for receiving and projecting the forward and reverse projecting divergent beam components. In another preferred embodiment, the second birefringent means further having an optical axis for defining an ordinary (o) beam component and an extraordinary (e) beam component transmitted therein for converging the forward-projecting beam components and diverging the reverse-projecting beam components according to an optical refraction of the ordinary (o) and extraordinary (e) beam components on each of the two incline surfaces. In anther preferred embodiment, the isolator further includes a polarization mode dispersion (PMD) compensator disposed next to the third birefringent means for receiving the output light for compensating optical paths between the forward-projecting beam components. In another preferred embodiment, the isolator further includes a first and a second polarization rotation means for rotating a polarization angle for each of the forward-projecting and reverse-projecting beam components before and after the forward-projecting and reverse-projecting beam components are transmitted to the second birefringent means.

In a preferred embodiment, this invention discloses an optical isolator for preventing a reverse light transmission in a forward light transmission device. The isolator includes a birefringent means for receiving forward-projecting beam components for converging the forward-projecting beam components into forward-projecting converging beam components ready for recombining into an output light, and for receiving reverse projecting beam components for diverging the reverse-projecting beam components for preventing recombining the reverse-projecting beam components.

Figure 3:
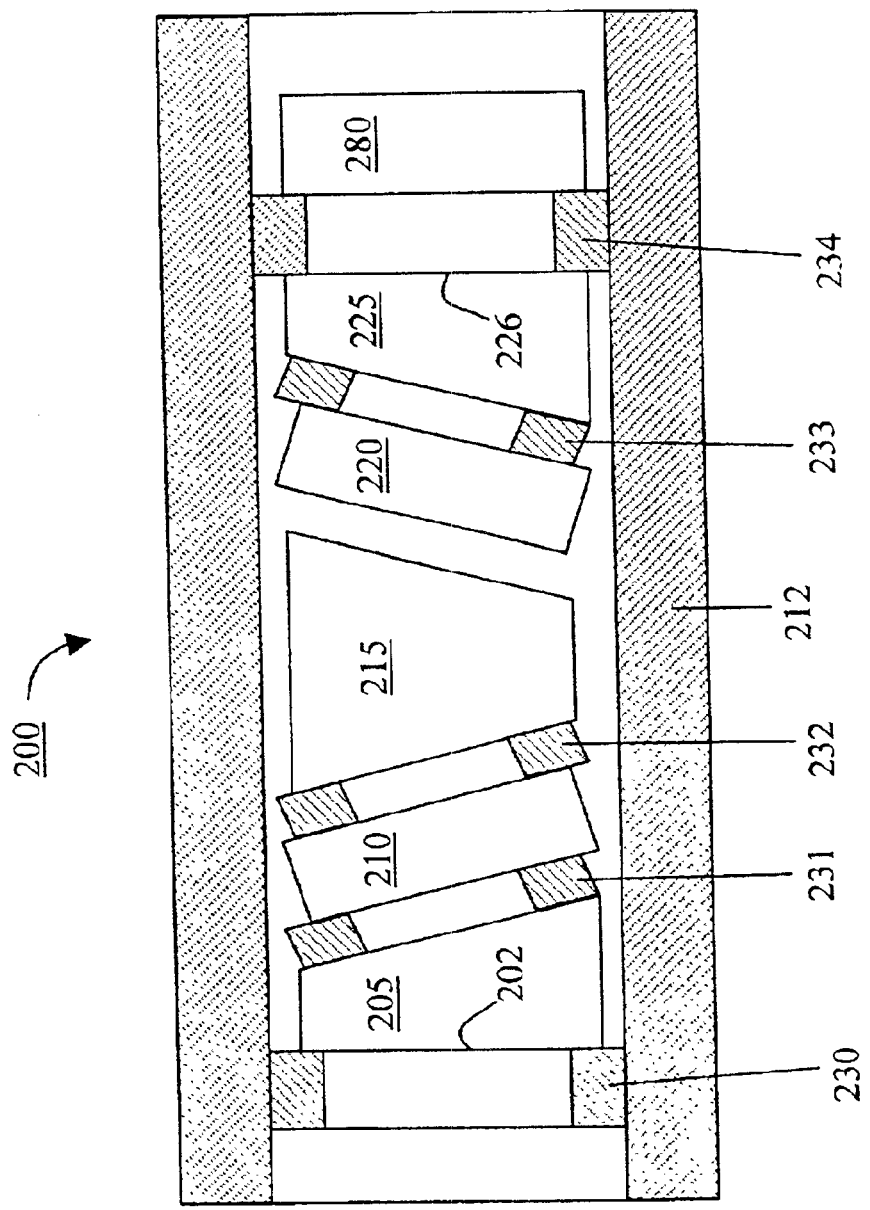
FIG. 3 is a cross sectional view of a preferred embodiment of an isolator assembled according to the improved configuration of this invention.

FIG. 3 depicts a cross-sectional schematic of the isolator core assembly 200 according to the embodiment of the present invention. According to the configuration described above, the three birefringent crystals 205, 215, 225 and two Faraday rotators 210, 220 are placed together with the use of metallic rings 230, 231, 232, 233, and 234 having predetermined thickness. A heat-curing epoxy, e.g., a heat-curing epoxy 353ND from Epoxy Technologies, is used to hold the optical components and metallic rings. For certain applications that require extremely small polarization mode dispersion (PMD), a PMD compensator 280 may be added at the output of the third birefringent crystal 225, or any place in the optical path. The PMD compensator may simply be another birefringent plate positioned with the norm of the front and rear surfaces aligned in the direction of beam propagation, and with the optical axis oriented perpendicular to the direction of beam propagation. The birefringent material of the compensator may be chosen the same as the birefringent crystals 205, 215, and 225, in the sense that birefringent crystals 280, 205, 215, and 225 are either all positive or negative. Then, the optical axis of the compensator is aligned perpendicular to the optical axis of the third birefringent crystal 225. Conversely, the birefringent material of the compensator may be chosen as different from the birefringent crystals 205, 215, and 225. Alternate choices may either be that the birefringent crystal 280 is positive and birefringent crystals 205, 215, and 225 are negative, or that the birefringent crystal 280 is negative and birefringent crystals 205, 215, and 225 are positive. Then, the optical axis of the compensator is aligned parallel to the optical axis of the third birefringent crystal 225. The thickness L of the compensator is chosen such that the optical path difference $n_oL-n_eL$ is introduced in the compensator 280 to compensates for the optical path difference incurred when beams 150, 151 travel from surface 102 to surface 126 as shown in FIG. 1A. Unlike the PMD compensation scheme used in the prior art, where PMD, isolation, and PDL need to be adjusted simultaneously, the PMD compensation process described above is de-coupled from the alignment process for isolation and polarization-dependent loss.

According to above descriptions, this invention further discloses a method for preventing a reverse light transmission in a forward light transmission device. The method includes a step of employing a birefringent means for receiving forward-projecting beam components for converging the forward-projecting beam components into forward-projecting converging beam components ready for recombining into an output light. And, for receiving reverse projecting beam components for diverging the reverse-projecting beam components for preventing recombining the reverse-projecting beam components. In a preferred embodiment, the step of employing a birefringent means further comprising a step of employing a birefringent means having a wedge shape with a first and second incline surfaces for receiving and projecting the forward-projecting and reverse-projecting beam components. In another preferred embodiment, the step of employing the birefringent means having a wedge shape further comprising a step of employing the birefringent means having an optical axis for defining an ordinary (o) beam component and an extraordinary (e) beam component transmitted therein for converging the forward-projecting beam components and diverging the reverse-projecting beam components according to an optical refraction of the ordinary (o) and extraordinary (e) beam components on each of the two incline surfaces. In another preferred embodiment, the method further includes a step of employing an input birefringent means for separating an input light into separate forward-projecting beam components and an output birefringent means for recombining the forward-projecting converging beam components into the output light. In another preferred embodiment, the method further includes a step of disposing a polarization mode dispersion (PMD) compensator next to the output birefringent means for receiving the output light for compensating optical paths between the forward-projecting beam components. In another preferred embodiment, the method further includes a step of employing a first and a second polarization rotation means for rotating a polarization angle for each of the forward-projecting and reverse-projecting beam components before and after the forward-projecting and reverse-projecting beam components are transmitted to the birefringent means.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An optical isolator for preventing a reverse light transmission in a forward light transmission device comprising:
   a first birefringent means for receiving an incident light projecting in a forward-projection direction for separating said incident light into forward-projecting separate beam components, a second birefringent means for receiving said forward-projecting separate beam components for converging said separate beam components into forward-projecting converging beam components for projecting into a third birefringent means for recombining into an output light; and
   said third birefringent means further receiving a reverse incident light transmitted in a reverse direction opposite said forward projecting incident light for separating said reverse incident light into reverse-projecting separate beam components to project into said second birefringent means for producing further diverged reverse-projecting beam components to project into said first birefringent means to further diverge said reverse-projecting further-diverged beam components in said first birefringent means;
   said second birefringent means having a birefringent optical axis for converging said forward-projecting divergent beam components and for further diverging said reverse-projecting separate beam components, and
   said second birefringent means further having a wedge shape with a first and second incline surfaces for receiving and projecting said forward and reverse projecting divergent beam components.

2. The optical isolator of claim 1 wherein:
   said second birefringent means further having an optical axis for defining an ordinary (o) beam component and an extraordinary (e) beam component transmitted therein for converging said forward-projecting beam components and diverging said reverse-projecting beam components according to an optical refraction of said ordinary (o) and extraordinary (e) beam components on each of said two incline surfaces.

3. The optical isolator of claim 1 further comprising:
   a polarization mode dispersion (PMD) compensator disposed at any place in the optical path for receiving said output light for compensating optical paths between said forward-projecting beam components.

4. The optical isolator of claim 1 further comprising:
   a first and a second polarization rotation means for rotating a polarization angle for each of said forward-projecting and reverse-projecting beam components before and after said forward-projecting and reverse-projecting beam components are transmitted to said second birefringent means.

5. An optical isolator:
   a birefringent means for receiving forward-projecting beam components for converging said forward-projecting beam components into forward-projecting converging beam components ready for recombining into an output light, and for receiving reverse projecting beam components for diverging said reverse-projecting beam components for preventing recombining said reverse-projecting beam components; and
   said birefringent means further having a wedge shape with a first and second incline surfaces for receiving and projecting said forward-projecting and reverse-projecting beam components.

6. The optical isolator of claim 5 wherein:
   said birefringent means further having an optical axis for defining an ordinary (o) beam component and an extraordinary (e) beam component transmitted therein for converging said forward-projecting beam components and diverging said reverse-projecting beam components according to an optical refraction of said ordinary (o) and extraordinary (e) beam components on each of said two incline surfaces.

7. The optical isolator of claim 5 further comprising:
   an input birefringent means for separating an input light into separate forward-projecting beam components and an output birefringent means for recombining said forward-projecting converging beam components into said output light.

8. The optical isolator of claim 7 further comprising:
   a polarization mode dispersion (PMD) compensator disposed at any place in the optical path for receiving said output light for compensating optical paths between said forward-projecting beam components.

9. The optical isolator of claim 5 further comprising:
   a first and a second polarization rotation means for rotating a polarization angle for each of said forward-projecting and reverse-projecting beam components before and after said forward-projecting and reverse-projecting beam components are transmitted to said birefringent means.

10. A method for preventing a reverse light transmission in a forward light transmission device comprising:
    employing a birefringent means for receiving forward-projecting beam components for converging said forward-projecting beam components into forward-projecting converging beam components ready for recombining into an output light, and for receiving reverse projecting beam components for diverging said reverse-projecting beam components for preventing recombining said reverse-projecting beam components; and
    said step of employing a birefringent means further comprising a step of employing a birefringent means having a wedge shape with a first and second incline surfaces for receiving and projecting said forward-projecting and reverse-projecting beam components.

11. The method of claim 10 wherein:
    said step of employing said birefringent means having a wedge shape further comprising a step of employing said birefringent means having an optical axis for defining an ordinary (o) beam component and an extraordinary (e) beam component transmitted therein for converging said forward-projecting beam components and diverging said reverse-projecting beam components according to an optical refraction of said ordinary (o) and extraordinary (e) beam components on each of said two incline surfaces.

12. The method of claim 10 further comprising:
    employing an input birefringent means for separating an input light into separate forward-projecting beam components and an output birefringent means for recombining said forward-projecting converging beam components into said output light.

13. The method of claim 12 further comprising:

disposing a polarization mode dispersion (PMD) compensator at any place in the optical path for receiving said output light for compensating optical paths between said forward-projecting beam components.

14. The method of claim 10 further comprising:

employing a first and a second polarization rotation means for rotating a polarization angle for each of said forward-projecting and reverse-projecting beam components before and after said forward-projecting and reverse-projecting beam components are transmitted to said birefringent means.

15. A method for preventing a reverse light transmission in a forward light transmission device comprising:

receiving an incident light projecting in a forward-projection direction into a first birefringent means for separating said incident light into forward-projecting separate beam components to project into a second birefringent means for converging said separate beam components into forward-projecting converging beam components for projecting into a third birefringent means for recombining into an output light:

receiving a reverse incident light transmitted in a reverse direction opposite said forward projecting incident light into said third birefringent means for separating said reverse incident light into reverse-projecting separate beam components to project into said second birefringent means for producing further diverged reverse-projecting beam components to project into said first birefringent means to further diverge said reverse-projecting further-diverged beam components in said first birefringent means: and said step of employing said second birefringent means further comprising a step of employing a birefringent means having a wedge shape with a first and second incline surfaces for receiving and projecting said forward-projecting and reverse-projecting beam components.

16. The method of claim 15 wherein:

said step of employing said second birefringent means having a wedge shape further comprising a step of employing said birefringent means having an optical axis for defining an ordinary (o) beam component and an extraordinary (e) beam component transmitted therein for converging said forward-projecting beam components and diverging said reverse-projecting beam components according to an optical refraction of said ordinary (o) and extraordinary (e) beam components on each of said two incline surfaces.

* * * * *